UNITED STATES PATENT OFFICE.

IWAN OSTROMISLENSKY, OF PETROGRAD, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCTS OBTAINED THEREBY.

1,249,180.     Specification of Letters Patent.     Patented Dec. 4, 1917.

No Drawing.     Application filed July 28, 1916. Serial No. 111,802.

*To all whom it may concern:*

Be it known that I, IWAN OSTROMISLENSKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing rubber or similar material—such as gutta-percha, balata, synthetic rubber, and materials commonly classed under the term "rubber"—and to the products obtained thereby. It is more particularly directed to a process for vulcanizing rubber in which the use of sulfur as the vulcanizing ingredient is obviated, and to the products resulting therefrom.

The vulcanization of rubber, according to the practice heretofore followed, is performed by the use of sulfur or a sulfur containing compound. Other methods which have been proposed employ halogens or sulfur-free halogen compounds, e. g. hypochlorous acid, hypochlorites, bromin, iodin, etc. Mention of these materials rarely occurs, however, outside of the literature, and according to such statements as appear in the literature they act to produce only hard rubber, resembling ebonite. The commercial importance, therefore, of other processes than that employing sulfur is practically negligible. Vulcanization by sulfur dominates the field. The use of sulfur has some objections which it is the object of the present invention to overcome. So far as concerns articles vulcanized by the use of sulfur aging occurs somewhat rapidly. Further, unavoidable excess of sulfur sometimes occurs in the articles to the detriment thereof; for example, the color of the article is affected and the life shortened, to remedy which a supplementary process of airing must be resorted to which lengthens the process of cure. Again the range of colors obtainable in rubber vulcanized by sulfur is limited, the majority of organic dyes under the usual conditions tending to change color.

The principal object of the present invention accordingly is to provide a simple and efficient process which by obviating the use of sulfur as the vulcanizing agent shall do away with the disadvantages noted in the use thereof, while obtaining important advantages in the vulcanized product. Another object is to provide a series of products having a wide range of desirable physical characteristics employing a vulcanizing agent or agents other than sulfur compounds.

Briefly stated, I accomplish the objects noted by subjecting the rubber or similar material to the action of an oxidizing agent, preferably in the absence of sulfur, whereby various types of vulcanized rubber usually obtainable with sulfur may be produced.

In carrying out the process in one of its preferred forms 50 grams of rubber are mixed with 2 grams of 1.3.5.tri-nitro-benzene, 1 gram of naphthylamin and 10 grams of lead oxid. The mixing process is carried on in an ordinary mill preferably at the usual temperature although any desired temperature may be employed. The mixture is placed in a metal mold and heated by the application of steam of a pressure of aproximately 45 pounds for a period of 55 minutes under the pressure of the vulcanizing press, at the end of which period vulcanization is complete. Or the mixture may be subjected to an open-heat cure or to any well-known procedure carried on in vulcanizing as heretofore practised with sulfur.

The product resulting from the above process possesses in general the desirable physical characteristics set forth in the objects before stated and possesses a high tensile strength. The rubber produced is soft and is generally applicable where soft rubbers produced by sulfur vulcanization have been used. It is especially resistant to aging not only under normal temperature but also when heated and thus finds a particular application for use in packing, steam hose, and in all cases where the vulcanized rubber must withstand the action of heat in use.

According to my theory the action of tri-nitro-benzene in effecting vulcanization is secured through the activity of one or more of the oxygen atoms of the nitro-groups, and it has been found in general that substances which have active oxygen atoms as tri-nitro-benzene are capable of effecting vulcanization to a greater or less degree. The nitro-compounds of the aromatic series are particularly useful, the compound mentioned in the preferred process above being simply one of a large class of such substances. This class includes nitrobenzol, dinitrobenzols, trinitrobenzols, and similar compounds of toluols, tri- and tetranitronaphthalenes, picric acid, picramic acid, picryl chlorid, artificial musk, nitrocyclohexane, aurotin, and many other nitro-dye stuffs, etc.

It will be furthermore noted that naphthylamin mentioned above is particularly useful in preventing aging, and in the presence of a metallic oxid such as one of the class mentioned below possesses also an accelerating power. Anilin, napththylamin, mentioned above, pyridin, piperidin, di-isoamylamin, operate in substantially the same manner.

The effect produced by the amins mentioned may be simulated by the use of very small traces (.05%) of sulfur, antimony, or substances having an alkaline reaction, as for instance, sodium alcoholate, and the like.

Lead oxid also provides a highly efficient accelerating action and in this capacity is a representative of a class of substances which act similarly in a greater or less degree. This class includes zinc oxid, calcium oxid, magnesium oxid, barium oxid.

It will be observed furthermore that the process of application of the nitro-compounds and other materials may be carried out under substantially all of the various conditions now in use for vulcanization by means of sulfur. The material, for example, may be immersed in a fused nitro-compound or solutions of nitro-compounds in various solvents may be added to various rubber solutions. In this connection it will be observed that it is not essential that the nitro-vulcanizing agent be employed at a temperature above its melting point although 1.3.5.tri-nitro-benzene, mentioned in the preferred example is fluid at the temperature there employed. The apparatus used may also be any of the well-known types employed in processes using sulfur.

It will be observed that the process above recited is not only applicable to natural rubber but may also be carried out in connection with the various artificial rubbers, synthetic rubbers, and similar substances as normal isoprene and erythrene india rubber, dimethylerythrene, etc. Also while I have laid particular stress in the present application upon organic vulcanizing agents containing oxygen, my invention is in no way limited to such classes.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises subjecting the rubber to an organic agent containing oxygen and inducing vulcanization to take place by the action of said agent.

2. A process for treating rubber or similar material which comprises subjecting the rubber to an organic material adapted to produce oxygen and inducing vulcanization to take place by the action of said oxygen.

3. A process for treating rubber or similar material which comprises subjecting the rubber to a fluid agent containing oxygen and nitrogen and inducing vulcanization within the mass to take place by the action thereof.

4. A process for treating rubber or similar material which comprises subjecting the rubber to a compound containing oxygen and nitrogen and causing vulcanization to take place by the action thereof.

5. A process for treating rubber or similar material which comprises adding an organic nitro-compound to said rubber and vulcanizing said rubber by the action of said compound.

6. A process for treating rubber or similar material which comprises adding an aromatic nitro-compound to said rubber and causing vulcanization to take place by the action of said compound.

7. A process for treating rubber or similar material which comprises adding a mono-cyclic aromatic nitro-compound to said rubber and causing vulcanization to take place by the action thereof.

8. A process for treating rubber or similar material which comprises subjecting the rubber to a vulcanizing agent containing oxygen in the presence of an accelerating agent and inducing vulcanization to take place by the action thereof.

9. A process for treating rubber or similar material which comprises subjecting the rubber to a vulcanizing agent containing oxygen in the presence of metallic oxid and inducing vulcanization to take place by the action thereof.

10. A process for treating rubber or similar material which comprises subjecting the rubber to a vulcanizing agent containing oxygen in the presence of anti-aging material, and inducing vulcanization to take place by the action thereof.

11. A process for treating rubber or similar material which comprises subjecting the rubber to a vulcanizing agent containing oxygen in the presence of a nitrogenous anti-aging material and inducing vulcanization to take place by the action thereof.

12. A process for treating rubber or similar material which comprises subjecting the rubber to a vulcanizing agent containing oxygen in the presence of an amin, and inducing vulcanization to take place by the action thereof.

13. A process for treating rubber or similar material which comprises subjecting rubber to a vulcanizing agent containing oxygen in the presence of an aromatic amin, and inducing vulcanization to take place by the action thereof.

14. A process for treating rubber or similar material which comprises subjecting the rubber to a vulcanizing agent containing oxygen in the presence of an anti-aging material, and inducing vulcanization to take place by the action thereof.

15. A process for treating rubber or similar material which comprises subjecting the rubber to a vulcanizing agent containing oxygen in the presence of a metallic oxid and an amin, and inducing vulcanization to take place by the action thereof.

16. A process for treating rubber or similar material which comprises subjecting the rubber to a vulcanizing agent containing oxygen in the presence of lead oxid and inducing vulcanization to take place by the action thereof.

17. A process for treating rubber or similar material which comprises subjecting the rubber to a vulcanizing agent containing oxygen in the presence of lead oxid and naphthylamin, and inducing vulcanization to take place by the action thereof.

18. As a new compound a soft vulcanized rubber containing products of the action of a vulcanizing agent comprising oxygen.

19. As a new compound a substantially sulfur-free soft vulcanized rubber containing products of the action of a vulcanizing agent comprising oxygen.

20. As a new compound a vulcanized rubber containing products of the action of an organic vulcanizing agent.

21. As a new compound a vulcanized rubber comprising products of the action of an organic vulcanizing agent containing oxygen.

22. As a new compound a vulcanized rubber containing products of the action of a vulcanizing agent comprising oxygen and nitrogen.

23. As a new compound a substantially sulfur-free vulcanized rubber comprising products of the action of a vulcanizing agent containing oxygen and nitrogen.

24. As a new compound a vulcanized rubber comprising products of the action of a vulcanizing agent including an organic nitro-compound.

25. As a new compound a vulcanized rubber comprising products of the action of a vulcanizing agent consisting of a monocyclic aromatic nitro-compound.

26. As a new compound a vulcanized rubber comprising products of the action of an accelerating agent and a vulcanizing agent containing oxygen.

27. As a new compound a vulcanized rubber comprising products of the action of a metallic oxid and a vulcanizing agent containing oxygen.

28. As a new compound a vulcanized rubber comprising products of the action of an anti-aging material and a vulcanizing agent containing oxygen.

29. As a new compound a vulcanized rubber comprising products of the action of a nitrogenous anti-aging material and a vulcanizing agent containing oxygen.

30. As a new compound, a vulcanized rubber comprising products of the action of an amin and a vulcanizing agent containing oxygen.

31. As a new compound a vulcanized rubber comprising products of the action of an aromatic amin and a vulcanizing agent containing oxygen.

32. As a new compound a vulcanized rubber comprising products of the action of a metallic oxid, an anti-aging material and a vulcanizing agent containing oxygen.

33. As a new compound a vulcanized rubber comprising products of the action of a metallic oxid, an amin and a vulcanizing agent containing oxygen.

34. As a new compound a vulcanized rubber comprising products of the action of lead oxid, naphthylamin and a nitro-benzene.

35. A process for treating rubber or similar material which comprises subjecting the rubber to an oxygen-containing vulcanizing agent having the property of producing soft rubber and inducing vulcanization for the production of a soft rubber to take place by the action thereof.

36. A process for treating rubber or similar material which comprises subjecting the rubber to an oxygen-containing sulfur-free vulcanizing agent having the property of producing soft rubber and inducing vulcanization for the production of a soft rubber to take place by the action thereof.

37. A process for treating rubber or similar material which comprises subjecting the rubber to a non-gaseous oxygen-containing vulcanizing agent having the property of producing soft rubber and inducing vulcanization for the production of a soft rubber to take place by the action thereof.

38. A process for treating rubber or similar material which comprises subjecting the rubber to an organic vulcanizing agent and inducing vulcanization to take place by the action thereof.

39. A process for treating rubber or similar material which comprises subjecting the rubber to an organic vulcanizing agent of the aromatic series and inducing vulcanization to take place by the action of said agent.

40. A process for treating rubber or similar material which comprises subjecting the rubber to an organic vulcanizing agent in the presence of an accelerating agent and inducing vulcanization to take place by the action thereof.

41. A process for treating rubber or similar material which comprises subjecting the rubber to an organic vulcanizing agent in the presence of a metallic oxid and inducing vulcanization to take place by the action thereof.

42. A process for treating rubber or similar material which comprises subjecting the rubber to an organic vulcanizing agent in the presence of an anti-aging material and inducing vulcanization to take place by the action thereof.

43. A process for treating rubber or similar material which comprises subjecting the rubber to an organic vulcanizing agent in the presence of a metallic oxid and an amin and inducing vulcanization to take place by the action thereof.

44. As a new compound a vulcanized rubber containing products of the action of an organic vulcanizing agent of the aromatic series.

45. As a new compound a vulcanized rubber containing products of the action of an organic vulcanizing agent and an accelerating agent.

46. As a new compound a vulcanized rubber containing products of the action of an organic vulcanizing agent an accelerating agent and an anti-aging material.

47. A process for treating rubber or similar material which comprises adding a polynitrobenzol to said rubber and causing vulcanization to take place by the action thereof.

Signed at Petrograd, Russia, this 17th day of November, 1916.

IWAN OSTROMISLENSKY.